United States Patent Office 2,779,415
Patented Jan. 29, 1957

2,779,415

PLUGGING FORMATIONS WITH HOT SOLUTIONS

George C. Howard, Tulsa, Okla., assignor to Stanolind Oil and Gas Company, Tulsa, Okla., a corporation of Delaware No Drawing. Application February 26, 1953, Serial No. 339,160

3 Claims. (Cl. 166—30)

This invention relates to plugging formations penetrated by wells. More particularly, it relates to plugging water and gas zones of oil producing wells.

Several means have been proposed in the prior art for plugging zones of formations penetrated by wells. Among these methods are several which plug the formation by depositing precipitates therein. These precipitates may be formed by chemical reaction of two materials or by dilution of a solution of a solid plugging agent. If two materials are injected into a zone where they react to form a plugging solid, oil producing zones are plugged as well as those producing water and gas. Furthermore, the degree of plugging depends on many variables such as the degree of mixing in formations of variable porosity and permeability, and variations in the nature and quantity of formation liquids and gases. If water dilution of a solution of the plugging solid is relied upon to precipitate the plugging material, control of the process is very difficult because of the variables just mentioned. In addition, most oil zones contain some water and may, therefore, be plugged together with the water zones. Also, the water dilution technique is inapplicable to the plugging of gas zones since little water is generally present in these zones.

In view of the above problems, an object of this invention is to provide an improved method and composition for plugging formations penetrated by wells. A more specific object of the invention is to provide a method and composition for plugging water and gas zones of formations penetrated by oil wells. An additional object of the invention is to provide a method and composition for plugging formations penetrated by wells, which method and composition do not depend on the nature and fluid content of the zones to be plugged, but which still permit automatic removal of the plug from oil producing zones.

In general, I accomplish the objects of my invention by injecting into the zones to be plugged a hot solution of an oil soluble and water insoluble solid in an oil soluble solvent. This hot solution contains sufficient solid so that upon cooling to formation temperature it becomes supersaturated. Consequently, part of the solid precipitates from the solution in the pores of the zones to be plugged. The amount of precipitate is usually critically controlled to leave some permeability, at least in the oil zones, so when the well is produced the oil will flow through the partially plugged oil producing zones and remove by solvent action the plugging solid from these zones. A second similar treatment then substantially completely plugs the non-oil producing zones, such as those producing water and gas, while the oil producing zones are only partially plugged as before, so that again these oil producing zones are cleared of plugging solids when the well is produced.

The oil soluble solid may be selected from a wide variety of materials such as hydrogenated animal and vegetable oils, naphthalene, anthracene, p-dichlorobenzene and the like. The solid may also be a natural resin such as abietic acid, a coal-tar resin such as the lower molecular weight cumerone-indene resins, or petroleum derived resins such as those prepared by the thermal polymerization of liquids formed in the cracking of light hydrocarbons. Many additional suitable materials will occur to those skilled in the art, the principal desirable properties being solubility in petroleum crude oils, less than complete miscibility with the solvent employed at the temperature of the formation to be plugged, substantial insolubility in water if water zones are to be plugged, and little volatility if gas zones are to be plugged.

The solvent should be soluble in crude oil to facilitate its removal from oil zones. It should have only a limited solvent power for the plugging solid at the temperature of the formation to be plugged so that only a small portion of the plugging solid will be lost by return to the well in the solvent. The solid should have a high thermal coefficient of solubility in the solvent to permit forcing a large amount of solid into solution with only a moderate amount of heat. Aromatic liquids such as benzene, toluene, and the like are suitable for most solids used. Ketones such as acetone and methyl ethyl ketone, esters such as ethyl acetate, ethers such as diethyl ether, or halogenated solvents such as carbon tetrachloride, generally may also be employed. The alcohols such as ethanol are sometimes also suitable. Mixtures of solvents are often advantageous. For example, carbon tetrachloride may be mixed with benzene to reduce the inflammability of the benzene. Distilled petroleum fractions, such as kerosene, constitute a preferred class of solvents, both because of desirable solvent properties, and because of low cost.

The amount of solids precipitated in the formation is critical since it has been found that if a precipitate forms amounting to more than about 35 percent of the volume of injected solution even the oil zones become so completely plugged that oil cannot flow through them to dissolve the plugging agent. Therefore, it is preferable to select the nature and amount of solvent and solids to cause precipitation of solids amounting to only about 20 to 30 percent of the volume of the injected solution, when the solution cools to formation temperature. It will be apparent, of course, that precipitation of smaller amounts of water insoluble and non-volatile solids in the water and gas zones will increase the ratio of oil to water and gas, and will therefore be beneficial.

The solution of the solid in the solvent may be prepared by heating the materials at the surface, the hot solution then being pumped down the well. For shallow wells less than about one thousand feet deep, it is usually possible to heat the solution hot enough at the well head to avoid precipitation of solids due to cooling, before the solution enters the formation. For deeper wells, the hot solution may be introduced through jacketed tubing, hot liquids such as water, or hot gases such as air or steam being circulated through the jacket to prevent heat loss from the hot solution.

It is preferred, in most cases, to introduce the solvent and solid into the tubing cold, the solid being finely divided and suspended in the solvent. A heater is then provided near the zone to be plugged to heat the suspension sufficiently to cause the solid to dissolve. The bottom-hole heat can be provided by any convenient means; for example, an electric heater can be employed. It is preferred, however, to employ chemical means for producing heat such as taught by U. S. Patent 1,736,440 issued to Hall. An emulsion of the solvent with acidified water may also be used, the emulsion then being passed over magnesium to generate heat near the zone to be plugged as described more fully and claimed in co-pending U. S. application 324,405 filed by Roscoe Clark on December 5, 1952.

A preferred method of preventing premature cooling of the solution is to pump into the formation ahead of the solution a volume of hot liquid to heat the formation. This formation-heating liquid may be any material not detrimental to the formation. Preferably, however, the liquid should be either crude oil from the formation or the solvent employed in preparing the solution. The temperature of the heating liquid may be above or below that of the solution which follows but must, of course, be above the formation temperature. Preferably, the temperatures of the heating liquid and the solution which follows should be approximately the same. The volume of the heating liquid should preferably also be approximately equal to that of the solution which follows, but may be more or less, the amount not being critical.

As previously noted, the principal application of this method is to the plugging of water and gas zones associated with oil producing zones in a well. In this application the hot solution injected into the zones penetrated by the well contains no solid; however, when the solution cools to formation temperature, the solid content amounts to less than 35 percent, and, preferably, from 20 to 30 percent, of the volume of the injected solution (or emulsion if an aqueous phase is present). This treatment does not completely plug any of the zones. Therefore, when the well is produced, gas, oil and water flow through their respective zones. Neither the gas nor water removes an appreciable amount of the plugging solid, but the oil flowing through the oil producing zone dissolves the oil soluble solid and removes it from this zone. A second plugging operation then substantially completely plugs the gas and water zones, while the oil zones again are only partially plugged so that flow of oil through these zones removes the plugging solid and restores the original permeability of the zones.

If a water or gas zone can be located with sufficient accuracy, and can be isolated from other zones by use of means such as packers, the process can be employed in a single step to establish a complete plug by causing a volume of precipitate to form in excess of 35 percent of the volume of the injected solution or emulsion. In such cases, there is no need to limit the solids or solvents to oil soluble materials; for example, the solvent may be water and the solid may be an inorganic salt such as potassium nitrate. In these cases, the process consists of injecting, at a temperature above that of the zone to be plugged, a solution of the plugging solid in a solvent for the solid, sufficient solid being in solution to form a precipitate exceeding about 35 percent of the volume of the solution when the solution cools to the temperature of the zone to be plugged. Some plugging, with consequent reduction in the production of the undesirable fluid, can be obtained by use of more dilute solutions which produce an amount of precipitate insufficient to form a complete plug when the solution is cooled to the temperature of the zone to be plugged. It will be noted that water soluble salts, such as potassium nitrate, may be employed for plugging water zones. This proposal is based on the observation that if a precipitate is formed amounting to more than about 35 percent of the volume of solution injected into a zone, flow through the zone is eliminated. Therefore, contact of the water soluble salt with the water in the zone is a static contact. Thus, the salt can dissolve in the water only by a diffusion process. This process is so slow that an effective plug is formed for an extended period of time amounting to several months or years if the zone is plugged to a distance of four or five feet from the well bore.

By use of materials, such as naphthalene or p-dichlorobenzene, having an appreciable volatility at formation conditions, water zones of gas producing formations can be plugged in a two-stage process. After the first stage, the well is produced for a sufficient time, as determined by measuring the production rate, to substantially clear the gas zones while the water zones remain partially plugged. A second plugging step then substantially completely plugs the water zone while again only partially plugging the gas zone. Production of the well then again clears the solid from the gas zone.

A desirable combination of solvent and solid consists of kerosene as the solvent and naphthalene as the solid. The following table presents data on the solubility of naphthalene in kerosene at various temperatures as an aid in preparing hot solutions of these materials which will form the desired amount of precipitate when cooled to formation temperature.

*Solubility of naphthalene in kerosene*

| Temperature, °F. | Solubility, Pounds per 42-Gallon Barrel |
| --- | --- |
| 80 | 57 |
| 90 | 68 |
| 100 | 83 |
| 110 | 104 |
| 120 | 134 |
| 130 | 177 |
| 140 | 234 |
| 150 | 301 |
| 160 | 375 |

An example of how these figures can be employed is as follows. Suppose the temperature of the zone to be plugged is 100° F. and it is decided to form a volume of precipitate in the formation amounting to 25 percent by volume of the injected solution. The two questions which must be answered are: first, how many pounds of naphthalene should be added to each barrel of kerosene? and second, to what temperature must the mixture be heated to cause all the naphthalene to dissolve in the kerosene? The amount of naphthalene to be added can be divided into two parts: the portion which remains in solution in the kerosene, and the portion which precipitates. The portion which remains in solution can be read directly from the table, and is 83 pounds. If the naphthalene which precipitates is to be 25 percent of the total volume of naphthalene and kerosene, then the volume of kerosene plus the naphthalene remaining in solution must be 75 percent by volume. The volume of the kerosene is one barrel, or 42 gallons. The volume of the naphthalene remaining in solution is 83/9.5 or 8.7 gallons since naphthalene weighs about 9.5 pounds per gallon. The total volume of kerosene and dissolved naphthalene is, therefore, 50.7 gallons. This is 75/25 or three times the volume of precipitated naphthalene. Precipitated naphthalene thus has a volume of $$50.7/3 = 16.9$$

gallons and a weight of $16.9 \times 9.5 = 160$ pounds. In preparing the mixture of naphthalene and kerosene the total amount of naphthalene to be employed is $160 + 83 = 243$ pounds per barrel of kerosene. Referring to the table, it is observed that the temperature of the mixture must be raised to about 145° F. in order to dissolve all the naphthalene in the kerosene.

From the above description, it will be apparent that the proposed method accomplishes the objects of my invention. The method provides a sure plug for zones penetrated by wells. The method is independent of the nature and fluid content of the zone to be plugged. In spite of this independence, by employing a two-stage treatment, the method can be employed to plug gas and water zones without plugging oil zones, and to plug water zones without plugging gas zones.

I claim:

1. The method of selectively plugging a non-oil-producing zone of a formation penetrated by an oil well comprising injecting into said formation at a temperature above that of said formation a solution of an oil-soluble, water-insoluble plugging agent in an oil-soluble solvent, said plugging agent being a solid at formation temperature and pressure and being non-reactive with said formation, sufficient plugging agent being in said solution when injected into said formation to form a precipitate when said solution is cooled to formation temperature, whereby the formation is partially plugged, the amount of plugging agent in said solution when injected being only sufficient to form a volume of precipitate less than 35 percent of the volume of the injected solution whereby some formation permeability is retained so that when the well is produced, oil flowing through any oil-producing zone dissolves the precipitated plugging agent injected into said zone to restore the permeability of such zone while said non-oil-producing zone remains partially plugged.

2. The method of claim 1 in which said plugging agent is naphthalene and said solvent is kerosene.

3. The method of claim 1 in which said well is produced for a sufficient time to restore at least most of the original permeability of any oil-producing zone and the plugging and producing steps are repeated whereby said non-oil-producing zone is plugged more completely than by the first plugging step, while the repeated flow of oil flowing through the oil-producing zone again restores its original permeability.

References Cited in the file of this patent

UNITED STATES PATENTS

| | | |
|---|---|---|
| 1,307,027 | Swan | June 17, 1919 |
| 1,507,619 | Olsson | Sept. 9, 1924 |
| 2,032,826 | Ambrose et al. | Mar. 3, 1936 |
| 2,034,347 | Loomis et al. | Mar. 17, 1936 |
| 2,258,829 | Berge et al. | Oct. 14, 1941 |
| 2,272,673 | Kennedy | Feb. 10, 1942 |
| 2,614,635 | Williams et al. | Oct. 21, 1952 |